J. W. PERRY.
Feather Renovator.
No. 93,901.
Patented Aug. 17, 1869.
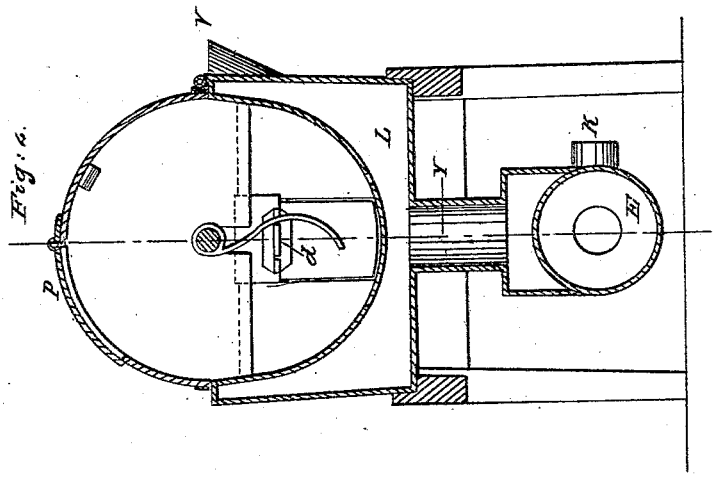
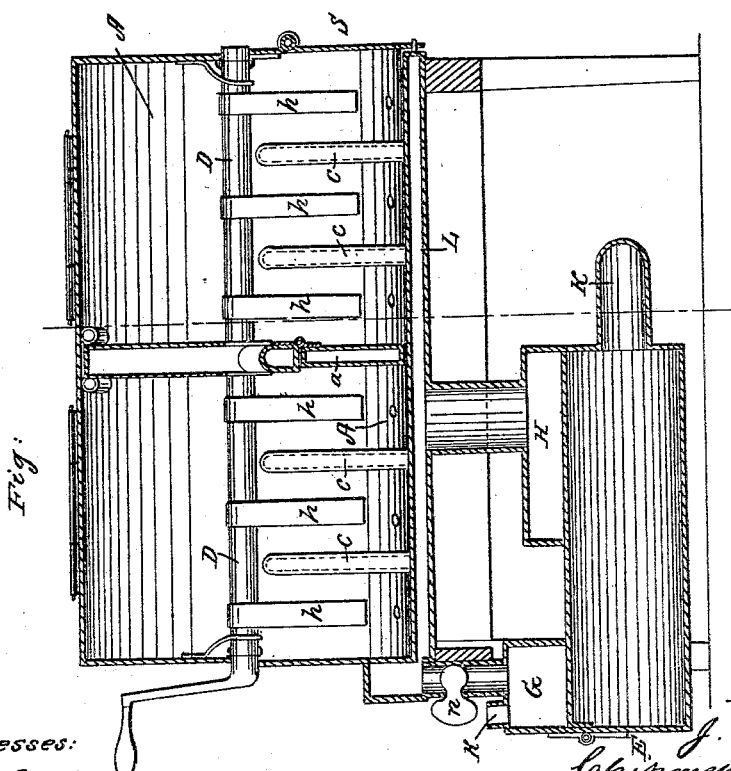
Witnesses:
Ell. Anderson.
James P. Graves.
Inventor:
J. W. Perry.
Chipman Hosmer & Co
attys.

United States Patent Office.

JOHN W. PERRY, OF PERRYSBURG, NEW YORK.

Letters Patent No. 93,901, dated August 17, 1869.

IMPROVEMENT IN FEATHER-RENOVATORS.

The Schedule referred to in these Letters Patent and making part of the same.

*To all whom it may concern:*

Be it known that I, JOHN W. PERRY, of Perrysburg, in the county of Cattaraugus, and State of New York, have invented a new and valuable Improvement in Feather-Renovators; and I do hereby declare that the following is a full, clear, and exact description of the construction and operation of the same, reference being had to the annexed drawings, making a part of this specification, and to the letters and figures of reference marked thereon.

Figure 1, of the drawings, is a representation of a longitudinal section of my invention.

Figure 2 is an end sectional view of the same.

My invention relates to means for renovating feathers; and

It consists, mainly, in the novel arrangement of devices intended to serve as an efficient apparatus for the designated purpose.

The letter A, of the drawings, represents a cylindrical box, with perforations through its bottom, with a partition, $a$, at its centre, and triangular-shaped knees, or partial partitions, marked $c$. The partition $a$ has a hinged door, $d$, arranged as shown.

The above-described cylinder is divided longitudinally at its centre, and the two sections are hinged and hooked together, for convenience in opening.

The letter D represents a revolving shaft, having affixed to it a series of beater-blades, $h$, which work in the compartments formed by the knees $c$. The shape of these beater-blades is shown on fig. 2 of the drawings.

The letter E represents a fire-place, and letter G a steam-boiler, arranged above the same.

The letter H represents a water-boiler, and letter K, the smoke-pipe, leading from the fire-place or stove E.

I make a second bottom to the cylinder A, and attach it thereto, about two inches, more or less, below the cylinder proper, leaving a space between the two for the circulation of steam. This second bottom is marked L on the drawings.

The letter N represents a cock, arranged to let the steam on or cut it off from the opening between the bottoms.

The letter K represents the escape-pipe for superfluous steam, or it may be used as an inlet for water to boiler H.

The boiler H serves the purpose of an ordinary steam-generator, and is also sometimes used for evaporating disinfectants among the feathers.

I make a door in the top of cylinder A, which is represented by the letter P, and I also arrange another door in the end of said cylinder, as represented at S.

The partition-knees, marked $c$, are hollow, and respectively communicate with the chamber below by means of openings for the admission of steam. They, therefore, serve the double purpose of reciprocating beaters and chambers for steam, giving great heating-surface to the interior of the renovator.

For the purpose of admitting water to the boiler H. I arrange a funnel at the rear side of the cylinder A, as shown at V, and make suitable openings through the cylinder-case leading from said funnel. The water is poured into said funnel. It passes therefrom through said openings into the chamber between the two bottoms, and thence through the pipe Y to the boiler.

What I claim as my invention, and desire to secure by Letters Patent, is—

1. The combination, with the fire-place E, of the boilers G and H, arranged substantially as described, and for the purpose set forth.

2. The knees, or partitions $c$, when applied to a feather-renovator, constructed and arranged to operate substantially as described.

3. The feather-renovator herein set forth, having cylinder A, shaft D, blades $h$, fire-place E, boilers G and H, and funnel $v$, constructed and arranged substantially as specified.

In testimony that I claim the above, I have hereunto subscribed my name, in the presence of two witnesses.

JOHN W. PERRY.

Witnesses:
  W. J. VANNONAN,
  R. L. NEVINS.